United States Patent [19]

Henningsen et al.

[11] 4,057,770

[45] Nov. 8, 1977

[54] ACOUSTO-OPTIC Q-SWITCH

[75] Inventors: Tom Henningsen, Monroeville; John J. Conroy, Verona, both of Pa.

[73] Assignee: Westinghouse Electric Corporation, Pittsburgh, Pa.

[21] Appl. No.: 673,562

[22] Filed: Apr. 5, 1976

[51] Int. Cl.² .............................................. H01S 3/11
[52] U.S. Cl. ........................... 331/94.5 Q; 350/161 W
[58] Field of Search .................... 331/94.5 C, 94.5 M, 331/94.5 Q; 350/161 W

[56] References Cited

U.S. PATENT DOCUMENTS

| 3,297,876 | 1/1967 | De Maria | 331/94.5 Q |
|---|---|---|---|
| 3,365,581 | 1/1968 | Tell et al. | 350/161 W |
| 3,389,348 | 6/1968 | De Maria | 331/94.5 Q |
| 3,544,916 | 12/1970 | Angelbeck | 331/94.5 Q |
| 3,660,777 | 5/1972 | Erickson | 331/94.5 Q |
| 3,729,250 | 4/1973 | Kusters et al. | 350/161 W |
| 3,736,525 | 5/1973 | Channin et al. | 331/94.5 M |
| 3,828,276 | 8/1974 | Cohen | 350/161 W |

Primary Examiner—William L. Sikes
Attorney, Agent, or Firm—M. P. Lynch

[57] ABSTRACT

An acousto-optic Q-switch consisting of an acoustic transducer and an acoustic absorber affixed in opposing relationship with a portion of a laser medium having a relatively high figure of merit, M, disposed therebetween, provides an integral structural combination for the function of the laser medium and Q-switch which avoids the resonating wave power losses, and eliminates the problem of reflection and alignment encountered in laser systems employing acousto-optic Q-switching devices which are separate and spaced apart from the laser medium.

7 Claims, 11 Drawing Figures

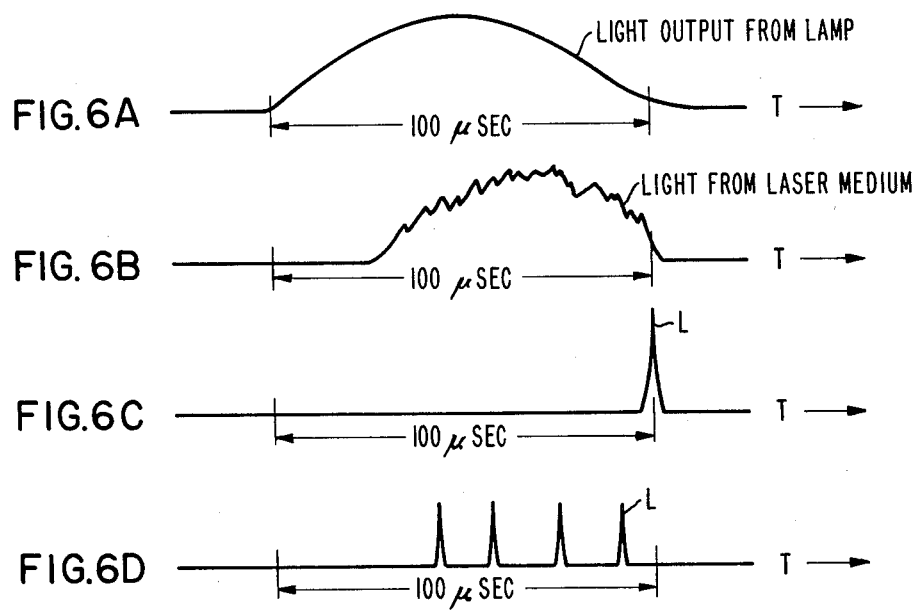
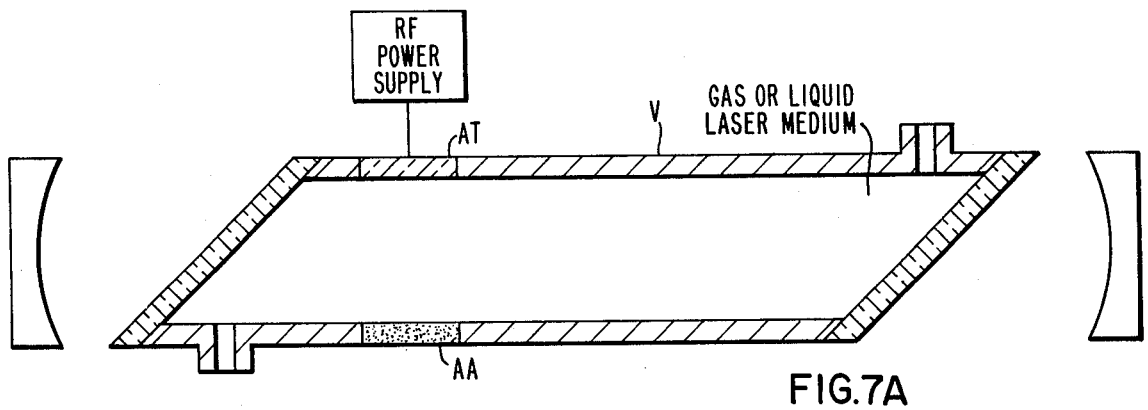
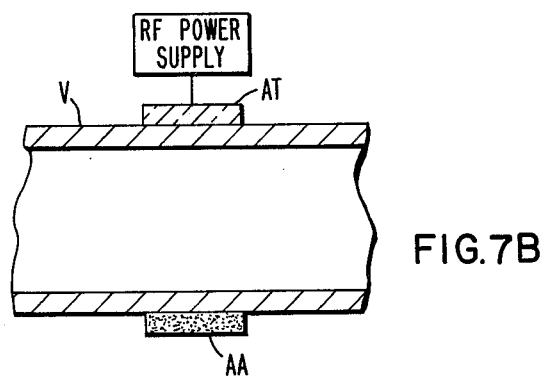

ACOUSTO-OPTIC Q-SWITCH

BACKGROUND OF THE INVENTION

Various techniques for Q-switching a laser have been described in the prior art, including techniques utilizing an acousto-optic Q-switching mechanism, which is spaced apart from the laser medium and aligned with the optical axis of the laser resonator, such that the acousto-optic material responds to electrical excitation by developing an acoustic beam which interacts with the optical beam generated in the laser resonator. The acousto-optic switching mechanism is arranged to prevent the generation of a laser output as long as sufficient optical loss is introduced into the resonator by the presence of an acoustic beam. When the acoustic beam is terminated, the acoustically introduced optical loss is eliminated, and the laser resonator releases its stored energy in a single pulse laser output of typically between 10 and 100 nanoseconds in length. The insertion of an acousto-optic Q-switching mechanism, which is separate and spaced apart from the laser medium, in accordance with the prior art technique, introduces additional optical surfaces through which the laser light must pass thus increasing the power losses encountered in the laser resonator.

The acousto-optic Q-switching mechanism functions as an optical shutter which, in response to RF excitation, appears as a closed shutter preventing the transmission of a laser output and as an open shutter in the absence of RF excitation thus permitting the transmission of a laser output. This laser modulation achieved by conventional acousto-optic Q-switching mechanisms provides a technique for controlling the energy content of the laser output in addition to determining the pattern of laser output pulses developed by the laser resonator.

A detailed discussion and illustration of an acousto-optical Q-switching mechanism positioned in a spaced apart relationship with a laser medium to operate in accordance with the above discussion is present in U.S. Pat. No. 3,746,886, issued July 17, 1973 and U.S. Pat. No. 3,805,196, issued Apr. 16, 1974 both of which are assigned to the assignee of the present invention and incorporated herein by reference.

SUMMARY OF THE INVENTION

There is disclosed herein with reference to the accompanying drawings a technique for incorporating the acousto-optic Q-switch as an integral part of the laser medium wherein an acoustic transducer and an acoustic absorber are positioned in opposed spaced apart relationship with the laser medium extending therebetween. Thus the Q-switching, as disclosed above with reference to a conventional Q-switching mechanism which is separate and spaced apart from the laser medium is achieved in the disclosed novel embodiment as an integral part of the laser medium thus eliminating the alignment complexities and power losses inherent in a laser system employing the conventional acousto-optic Q-switching mechanism. Substantial cost savings can also be realized from the implementation of this invention.

The elimination of the separate, discrete acousto-optic Q-switch can also be achieved by the integral combination of the acoustic tansducer and of an oppositely positioned acoustic absorber on surfaces of essential elements in laser apparatus, such as a mode controlled etalon. The incorporation of the acousto-optic Q-switch as an integral part of the mode control elaton of a laser apparatus affords the additional advantage of operating on the laser light at higher intensity than that present in the laser medium. Thus the acoustic wave energy necessary to produce the desired angle of light diffraction is less thus reducing the excitation power requirement to the acoustic transducer.

Inasmuch as the function of the acousto-optic Q-switch is to diffract the light energy emitted by the laser medium from the defined optical axis of the laser apparatus to prevent the transmission of a laser output from the laser apparatus until a predetermined time when the excitation power to the acoustic transducer is terminated, the concept of utilizing the laser medium as the medium for supporting the transmission of acoustic waves from an acoustic transducer to an acoustic absorber is applicable to any laser medium suitable for conducting acoustic wave energy. Thus while the preferred embodiment disclosed herein and discussed with reference to the accompanying drawings depicts a solid state laser medium, it is apparent that the novel concept is also applicable to liquid and gas laser media inasmuch as both liquid and gas clearly represent media capable of supporting transmission of acoustic wave energy.

In order for the laser medium to function adequately as an integral part of the Q-switch of the laser apparatus, the laser medium should be a composition exhibiting a figure of merit, M, which is a measurement of the fraction of light diffracted for a given amount of acoustic power, sufficient to introduce the desired optical loss, where $$M = n^6 p^2 / \rho v^3$$

wherein $n$ is the refractive index, $p$ is the photoelastic constant, $v$ is the acoustic velocity and $\rho$ is the density. Further, the laser medium functioning as an acousto-optical material, should have a sufficiently low acoustic attenuation to allow the acoustic wave to propagate across the laser medium before it is absorbed.

Solid laser rod materials particularly suitable as a laser medium which, in combination with an acoustic transducer and an acoustic absorber in accordance with the teachings of this invention, form a suitable acousto-optic Q-switch include glass and numerous crystalline laser materials, i.e., YAG, in combination with their various doping ions such as Nd, Er and Ho. Of particular interest, in forming the integral laser Q-switch combination, is the laser material identified as silicate or germanate oxyapatite having the formula $EM_4(ZO_4)_3O:A$ wherein E can be Sr, Ba, Mg or Ca; M can be La, Gd or Y; Z can be Si or Ge; and A, which is the lasing ion, can be Nd, Er or Ho; where A can be substituted for E or M in the amount from about 0.02 to 20 atom %. This latter family of laser materials, often referred to as "SOAP", are described in detail in the issued U.S. Pat. Nos. 3,632,523, issued Jan. 4, 1972; 3,634,281, issued Jan. 11, 1972; 3,659,221, issued Apr. 25, 1972; and 3,781,707, issued Dec. 25, 1973, all of which are assigned to the assignee of the present invention and incorporated herein by reference. The particular advantage in utilizing a SOAP material in the integral laser Q-switch combination disclosed herein, develops from the inherent low gain and high acoustic velocity characteristics of these materials. The low gain characteristic results in a relatively slow buildup of the light intensity in the laser material while the high acoustic velocity characteristic provides a rapid transmission of the acoustic wave from the acoustic transducer to the acoustic absorber. These combined characteristics essentially assures that the transmission of the acoustic wave through the laser material following the termination of the excitation to the acoustic transducer will be completed before a desired transmission of a laser output occurs.

While the embodiment selected to illustrate the invention incorporates a solid state laser medium, the concept of forming an integral combination of the laser medium and the acousto-optic Q-switch applies equally to liquid and gas laser media.

Further while the selected embodiment employs flash lamp excitation, the inventive concept is equally applicable in embodiments employing other modes of excitation.

In the application of the invention to a CW laser mode of operation, the acousto-optic Q-switch mechanism can function as a modulator to develop a laser output pattern to satisfy the intended operating purpose of the laser apparatus, i.e., transmission of information.

DESCRITION OF THE DRAWINGS

The invention will become more readily apparent from the following exemplary description in connection with the accompanying drawings:

FIGS. 6A, 6B, 6C and 6D are waveform illustrations of a pulsed solid state laser apparatus incorporating Q-switching; and FIGS. 7A and 7B are schematic illustrations of the integral combination of the acousto-optic Q-switch with a gas or liquid laser apparatus.

DESCRIPTION OF THE PREFERRED EMBODIMENT

Figure 1:
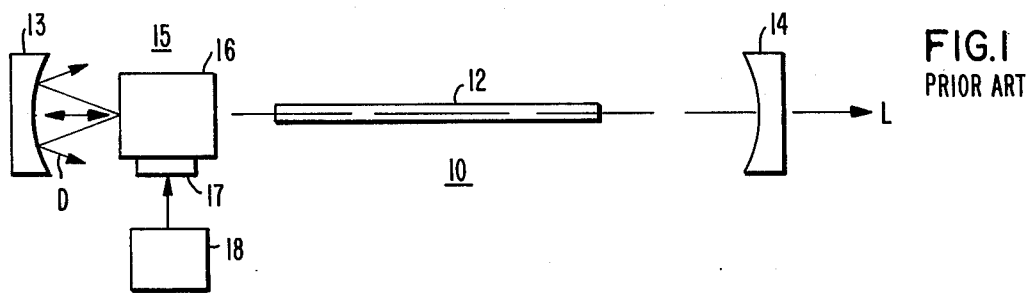
FIG. 1 is a schematic illustration of a PRIOR ART laser apparatus incorporating a separate and discrete acousto-optic Q-switching mechanism.

Referring to FIG. 1, there is illustrated a schematic embodiment of a PRIOR ART laser apparatus 10 employing a separate and discrete acousto-optic Q-switch 15. In the embodiment of FIG. 1, the laser medium 12 produces a beam of coherent light which is multiply-reflected between mirrors 13 and 14. Mirror 13 totally reflects the light and mirror 14 partially reflects and partially transmits it as the laser output L. Disposed between lasing medium 12 and mirror 13 is the acousto-optic Q-switch 15. Acousto-optic Q-switch 15 could be positioned between mirror 14 and the lasing medium 12 and still function in an identical manner. The acousto-optic Q-switch 15 consist of crystal 16 and a transducer 17 affixed thereto. An RF generator 18, which is operably connected to the transducer 17, produces a radio frequency signal which transducer 17 converts into an acoustic wave which moves through crystal 16 diffracting the light output from laser medium 12 as shown at D. This structure and function is described in detail in the above-identified U.S. Pat. Nos. 3,746,866 and 3,805,196.

Figure 2:
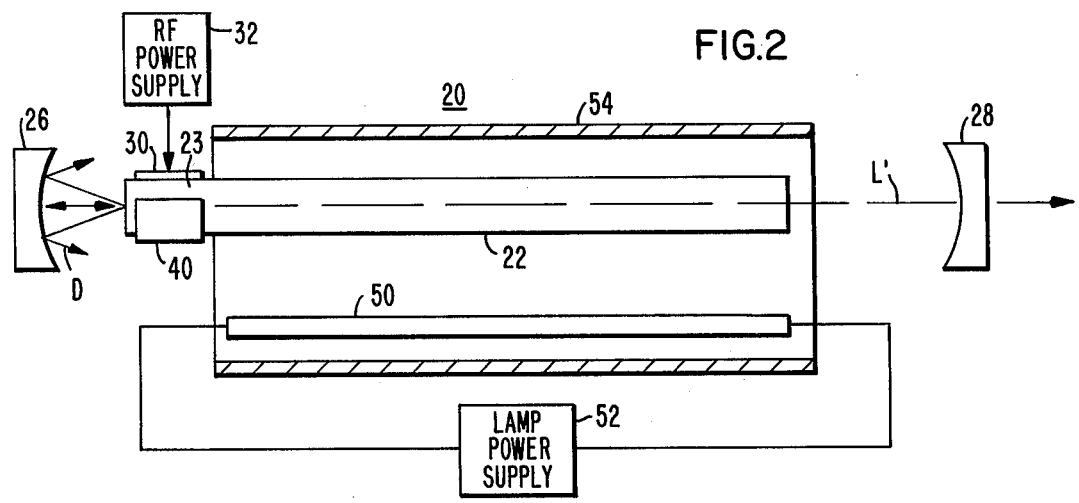
FIG. 2 is a schematic illustration of a laser apparatus employing the integral combination of the laser medium and an acousto-optic Q-switch in accordance with the invention.

The discrete laser elements represented as laser medium 12 and acousto-optic Q-switch 15 of FIG. 1 have been replaced by the laser medium 22 of the laser apparatus 20 of FIG. 2 wherein a laser medium portion 23 of the laser medium 22 is disposed between acoustic transducer 30 and acoustic absorber 40 to function in a manner similar to the crystal 16 of FIG. 1. The combination of laser medium portion 23, acoustic transducer 30 and acoustic absorber 40 for the acousto-optic Q-switch S.

The laser medium selected for illustrating the invention is a solid state laser rod material exhibiting the preferred operational characteristic described above. The laser apparatus embodiment selected to illustrate a preferred embodiment of the invention is that of a pulsed laser apparatus including a flash lamp 50, a flash lamp power supply 52 and a pump light reflector 54. The periodic emission of light from the flash lamp 50 in response to excitation by the power supply 52 excites the laser medium 22 to produce coherent light as described above. The pump light reflector functions to focus or reflect light output from the flash lamp 50 onto the laser medium 22. The beam of coherent light developed by the laser medium 22 in response to light excitation by flash lamp 50, is multiply-reflected between mirrors 26 and 28. Mirror 26 totally reflects the light while mirror 28 partially reflects the light and partially transmits it as laser output L'. The well-defined laser energy output path corresponding to laser output L' is selectively diffracted by the acousto-optical Q-switch S consisting of the laser medium portion 23, acoustic transducer 30 and acoustic absorber 40 in response to RF excitation of the acoustic transducer 30 by the RF power supply 32. As indicated above, the RF power supply 32 produces a radio frequency electrical signal which acoustic transducer 30 converts into an acoustic wave which moves through the laser medium 23 to diffract the light output of laser medium 22 as shown at D'. The diffraction of the light, as illustrated at D', substantially limits re-entry of the light into the laser medium.

The acoustic absorber 40 functions to absorb the transmitted sound waves preventing random reflection of sound waves back through the laser medium 23 thereby assuring concise Q-switching control by the RF power supply 32. While numerous known materials including crystalline quartz, can satisfy the function of the transducer 30, detailed experimentation of the laser apparatus 20 of FIG. 2 indicates a composition of LiNbO$_3$ provides a preferred implementation of the transducer 30.

The implementation of the acoustic absorber 40 can be satisfied through the use of any of numerous compositions, such as wax and epoxy which effectively absorb the sound waves transmitted from the transducer 30. Of particular practical use, is an acoustic absorber consisting of indium pressed and maintained in intimate contact with the laser medium 23.

A composition of indium metal and mercury to form indium amalgamate represents a particularly suitable acoustic absorber material which can be painted on the surface of the laser medium.

The sound waves transmitted from the transducer 30 through the laser medium 23 to the acoustic absorber 40 are composed of alternating compression and rarefraction fronts. The indices of refraction in these fronts is different, so that the laser medium 23 acts as a diffraction grating, diffracting light which passes through it in response to the excitation of the transducer 30 by the RF power supply 32. The angle of diffraction increases as the frequency of the sound wave increases and is determined by the RF power supply 32. The amount of light diffracted increases with the intensity of the sound wave.

The waveform illustrations of FIGS. 6A and 6B illustrate the excitation of the laser medium 22 in response to light output from the flash lamp 50. The waveforms of FIGS. 6C and 6D illustrate the control of the laser output L' by the acousto-optic Q-switch S in response to the excitation by the RF power supply 32. FIG. 6C illustrates an excitation pattern by the RF power supply 32 which produces a single maximum energy laser output L as a pulse occurring at the conclusion of the light output from flash lamp 50. FIG. 6D illustrates an excitation pattern of the acoustic transducer 30 by the RF power supply 32 to produce a laser output L consisting of a plurality of pulses of light energy. The Q-switching operation determined by the RF power supply 32 is a manner of design preference determined by the intended use of the laser apparatus 20.

It is apparent that the above structure and operation for Q-switching the laser apparatus 20 will apply equally to a laser apparatus wherein the lamp 50 provides continuous light excitation of the laser medium 22 instead of the pulse excitation disclosed above.

Figure 3:
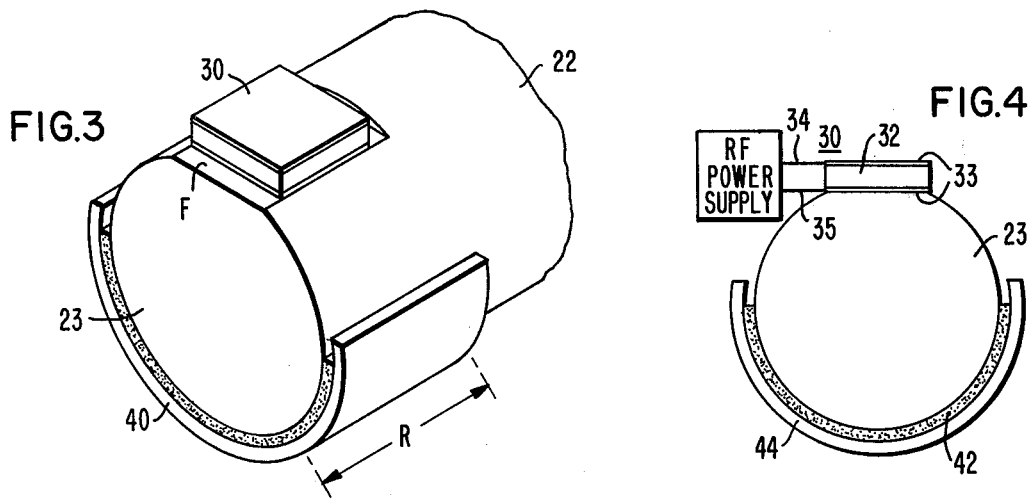
FIG. 3 is a pictorial illustration of a typical embodiment of the combination of a laser medium and an acousto-optic Q-switch mechanism as used in FIG. 2.
Figure 4:
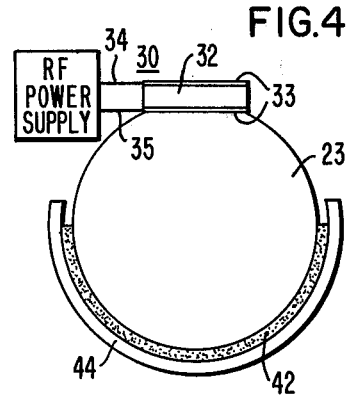
FIG. 4 is an end view of the illustration of FIG. 3.

The integral combination of the acousto-optic Q-switch S and the laser medium 22 of FIG. 2 is illustrated in detail in FIGS. 3 and 4.

In FIG. 3, the laser medium portion 23 is provided with a flat surface F to which the acoustic transducer 30 is bonded. The acoustic absorber is illustrated in an intimate contacting relationship with the opposite surface of the laser medium portion 23 and extending over a sufficient area of the side wall of the laser medium portion 23 to assure complete absorption of the sound waves transmitted through the laser medium portion 23 from the acoustic transducer 30. The length R of the acousto-optic Q-switch S is determined in part by the characteristic of the laser medium portion 23, the transducers 30 and the RF power supply 32. An increase interaction region corresponding to the laser medium portion 23 can be increased by increasing the length R of the acoustic switch Q as a technique for minimizing the adverse affects of heating due to high power RF excitation by distributing the operation of the acoustic Q-switch S over a larger surface area of the laser medium 22.

A typical implementation of the acoustic transducer 30 and the acoustic absorber 40 is illustrated in FIG. 4. The acoustic transducer 30 is illustrated as consisting of transducer material 32 consisting of $LinBO_3$ and gold electrodes 33 disposed on opposite surfaces thereof to which the leads 34 and 35 of the RF power supply 32 are connected. The acoustic absorber is illustrated as consisting of a composition of indium amalgamate 42 being pressed and maintained in intimate contact with the laser medium portion 23 by a stainless steel retainer 44.

Figure 5:
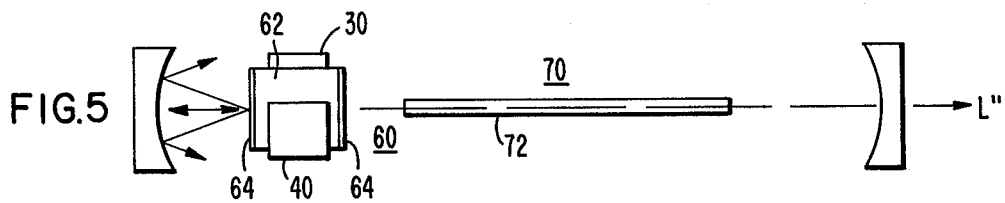
FIG. 5 is an alternate embodiment of the acousto-optic Q-switch with an etalon of a laser apparatus.

The embodiment of FIG. 5 illustrates the combination of the acoustic transducer 30 and the acoustic absorber 40 on opposite surfaces of an etalon 60 positioned within a laser apparatus 70, while the embodiments of FIGS. 7A and 7B illustrates an acoustic Q-switch in combination with a gas or liquid laser apparatus 70 in accordance with the teachings of this invention.

The etalon 60, a well known element in a laser system is illustrated as consisting of a fused silica element 62 and dielectric coatings 64. The dielectric coatings 64 are typically 30% reflective. The light output from the laser medium 72 is reflected back and forth within the etalon 60 with functions as a frequency selector to determine the frequency bands of the laser output L".

An advantage of this embodiment of acousto-optic Q-switch is that the acoustic wave operates on several reflections of the light output from the laser medium and thus can introduce greater optical losses consistent with the desired operation of the acousto-optic Q-switch.

The acousto-optic Q-switch of the gas/liquid laser embodiments of FIGS. 7A and 7B consists of an acoustic transducer AT and an acoustic absorber AA which may be an integral part of the wall of vessel V, as in FIG. 7A, or may be attached to the external surface of the wall of vessel V as illustrated in FIG. 7B. The configuration selected and the laser medium employed will determine the amount of RF excitation required as well as the frequency of the acoustic wave developed by the acoustic transducer AT.

What is claimed is:

1. In a laser apparatus having a resonant optical cavity including a laser medium, means for exciting the laser medium to emit a light beam, optical reflective element at either end of the optical cavity to multiply-reflect the light beam through the laser medium with one of the optical reflective elements being partially transmissive to the light beam to transmit a laser output beam, and an etalon disposed between one end of said laser medium and one of said optical reflective elements to determine the frequency bands of the laser output beam, the combination of, an acoustic-optic Q-switch means affixed in combination with said etalon and responsive to RF excitation by transmitting acoustic waves through said etalon to diffract the light beam emitted by said laser medium.

2. A laser apparatus comprising,
a cylindrical solid laser rod medium composed of a crystalline laser material,
means for exciting said solid laser rod medium to emit a light beam,
optical reflective elements positioned at either end of said cylindrical solid laser rod medium to define a laser optical cavity, and
an acousto-optic Q-switch means affixed in intimate contact with one end of said cylindrical laser rod medium and responsive to RF excitation by transmitting acoustic waves through said cylindrical laser rod medium to diffract the light beam emitted by the cylindrical solid laser rod medium, said acousto-optic Q-switch means consisting of a flat transducer means, a portion of the end of said cylindrical solid laser rod medium having a flat portion to accommodate said flat transducer means, and acoustic absorber means opposite said flat acoustic transducer means and covering a sufficient portion of the curved surface of said cylindrical solid rod laser medium to provide substantially complete absorption of the sound waves transmitted through the cylindrical solid laser rod medium from the acoustic transducer means, said acousto-optic Q-switch means being affixed to an end portion of said cylindrical solid laser rod medium which is not directly exposed to the excitation provided by said means for exciting said cylindrical solid laser rod medium.

3. In a laser apparatus as claimed in claim 2 wherein said acoustic transducer consists of an $LiNbO_3$ crystal with electrodes disposed on opposite surfaces thereof.

4. A laser apparatus comprising, a solid laser rod medium of a crystalline composition exhibiting a low gain characteristic providing a slow buildup of light intensity in the laser rod medium in response to Q-switching of the solid laser rod medium, means for exciting said solid laser rod medium to emit a light beam, optical reflective elements positioned at either end of said solid laser rod medium to define a laser optical cavity, and an acousto-optic Q-switch means affixed in intimate contact with said solid laser rod medium and responsive to RF excitation by transmitting acoustic waves through said solid laser rod medium to diffract the light beam emitted by said solid laser rod medium.

5. In a laser apparatus as claimed in claim 4 wherein the solid laser medium is a silicate or germanate oxyapatite having the formula, $$Em_4(ZO_3O:A$$

wherein
$E$ = Sr, Ba, Mg or Ca
$M$ = La, Gd or Y
$Z$ = Si or Ge
$A$ = Nd, Er or Ho; A representing the lasing ion, and A is substituted for E or M in an amount from about 0.02 to 20 atom %.

6. A laser apparatus as claimed in claim 4 wherein said acousto-optic Q-switch means is located on a portion of said solid laser rod medium which is not subject to direct excitation by said means for exciting.

7. A laser apparatus as claimed in claim 6 wherein said means for exciting includes a flashlamp means.

* * * * *